United States Patent
Fontanot

(10) Patent No.: US 7,970,484 B2
(45) Date of Patent: Jun. 28, 2011

(54) METHOD OF CONTROLLING A PRODUCTION PROCESS

(75) Inventor: Paolo Fontanot, Monfalcone (IT)

(73) Assignee: Siemens Aktiengesellschaft, Munich (DE)

( * ) Notice: Subject to any disclaimer, the term of this patent is extended or adjusted under 35 U.S.C. 154(b) by 353 days.

(21) Appl. No.: 12/254,252

(22) Filed: Oct. 20, 2008

(65) Prior Publication Data

US 2009/0105866 A1    Apr. 23, 2009

(30) Foreign Application Priority Data

Oct. 18, 2007  (EP) .................................... 07020380
Jul. 14, 2008  (EP) .................................... 08160326

(51) Int. Cl.
*G06F 19/00*     (2011.01)
*G06F 7/00*      (2006.01)

(52) U.S. Cl. ........ 700/115; 700/116; 700/221; 700/224; 700/226; 700/227

(58) Field of Classification Search .......... 700/115–116, 700/221–222, 224–228
See application file for complete search history.

(56) References Cited

U.S. PATENT DOCUMENTS

| | | | |
|---|---|---|---|
| 5,153,842 A | 10/1992 | Dlugos, Sr. et al. | |
| 5,768,140 A * | 6/1998 | Swartz et al. | 700/225 |
| 6,078,845 A * | 6/2000 | Friedman | 700/104 |
| 6,449,522 B1 * | 9/2002 | Conboy et al. | 700/121 |
| 6,516,234 B2 * | 2/2003 | Kamiguchi et al. | 700/20 |
| 6,959,226 B2 * | 10/2005 | Hsieh | 700/115 |
| 7,128,270 B2 * | 10/2006 | Silverbrook et al. | 235/472.01 |
| 7,516,057 B2 * | 4/2009 | Bridgelall | 703/13 |
| 7,555,358 B2 * | 6/2009 | Jones et al. | 700/121 |
| 7,561,938 B2 * | 7/2009 | Akram et al. | 700/121 |
| 7,764,191 B2 * | 7/2010 | Hall et al. | 340/825.69 |
| 2002/0167500 A1 | 11/2002 | Gelbman | |
| 2003/0158795 A1 * | 8/2003 | Markham et al. | 705/28 |
| 2005/0127174 A1 | 6/2005 | Hoshina | |
| 2006/0091206 A1 | 5/2006 | Olsen et al. | |
| 2006/0191993 A1 * | 8/2006 | Markham et al. | 235/376 |
| 2006/0200261 A1 * | 9/2006 | Monette et al. | 700/108 |
| 2007/0035395 A1 | 2/2007 | Trosper | |
| 2007/0156545 A1 * | 7/2007 | Lin | 705/28 |
| 2008/0077465 A1 * | 3/2008 | Schimpf et al. | 705/8 |

(Continued)

FOREIGN PATENT DOCUMENTS

EP    0877331 A2    11/1998

(Continued)

*Primary Examiner* — Ramesh B Patel
(74) *Attorney, Agent, or Firm* — Laurence A. Greenberg; Werner H. Stemer; Ralph E. Locher

(57) ABSTRACT

In order to increase the efficiency of a production process a new method is presented. Thereby a flow of items is generated in a production system. Electronic devices that are attachable to the items are used for tracking the items. An identification of a first electronic device attached to a first item is read out. The identification is forwarded to a computer system that steers the flow of items. Due to a reception of the identification by the computer system, a transport status indicating authorization or prohibition to process the second item is set. The transport status is then transmitted to a second electronic device with an authorizing signal that is sent from the computer system to the second electronic device. The second electronic device contains a signal receiver circuit for receiving the authorizing signal and the second electronic device is attached to the second item.

15 Claims, 4 Drawing Sheets

U.S. PATENT DOCUMENTS

| | | | |
|---|---|---|---|
| 2008/0189325 A1* | 8/2008 | Hanses et al. | 707/104.1 |
| 2009/0102613 A1* | 4/2009 | Fontanot | 340/10.4 |
| 2009/0114714 A1* | 5/2009 | Huang et al. | 235/376 |
| 2009/0276082 A1* | 11/2009 | Murata | 700/226 |

FOREIGN PATENT DOCUMENTS

| | | |
|---|---|---|
| NL | 1012735 C2 | 2/2001 |
| WO | 2006012997 A2 | 2/2006 |
| WO | 2006071477 A1 | 7/2006 |

* cited by examiner

METHOD OF CONTROLLING A PRODUCTION PROCESS

CROSS-REFERENCE TO RELATED APPLICATION

This application claims the priority, under 35 U.S.C. §119, of European applications EP 07020380.7, filed Oct. 18, 2007, and EP 08160326.8, filed Jul. 14, 2008; the prior applications are herewith incorporated by reference in their entireties.

BACKGROUND OF THE INVENTION

Field of the Invention

The present invention relates to the technical field of controlling a production process with a manufacturing execution system.

In the context of this document, the term "item" shall be understood in a general way. Typical examples of items are not limited to, but include objects that occur in a production process such as raw materials, pre-products, intermediate products, or finished products, assemblies, sub-assemblies, pallets, containers, and components.

In the context of this document, the term "to process an item" shall be understood in a general way, which is not limited to, but includes:
- transformation of the item into another item;
- processing the item together with other items, in order to produce a new product;
- transformation of a material that is contained within the item (e.g. in case the item is a container) into another material;
- processing of a material that is contained within the item together with other materials in order to obtain another material;
- simply moving the item (e.g. by translation or rotation of the item); and
- processing together with other items: in particular assembling different items to produce a new item (either a finished product or a sub-assembly).

Just-In-Time (JIT) methods are used in discrete-manufacturing to synchronize the production flow within a factory. They can provide a timely response to production requests without the need for costly safety-stock inventories and avoiding queues and bottlenecks at the key production stages.

The goal of providing an excellent service level keeping at the same time the lowest possible work in process (WIP: the undesirable inventory amount caught up in the manufacturing process) can be achieved by using JIT techniques also known as "kanban". Basically kanban relies on the fact that within a JIT working factory there are two different streams: a flow of materials (often also called forward flow of materials) passing through the production stages and a stream of information (the "kanban" signals, often also called backward stream of information) that virtually "pulls" the activity of the upstream workstations synchronizing the produced goods. A production stage thereby usually contains one or more workstations. Kanban uses visual signals in order to authorize production activities without the need for releasing and dispatching production orders to the shop floor. Workstations operate only when a "production kanban" is received producing then a fixed amount of material (either a subassembly or a final product) that is moved to the downstream stage when a "movement kanban" is issued.

The Japanese word "kanban" is a common everyday term meaning "sign" or "card": thus kanban is basically a signaling system. As its name suggests, kanban can use cards to signal the need for an item. Other devices such as plastic markers (kanban squares) can also be used to trigger the movement, production, or supply of a unit in a factory.

FIG. 1 shows a process of production of items, using kanban cards, according to the prior art. An operator OP at a workstation WS is authorized to produce only when one or more kanban cards K (often in the red color, therefore addressed as red labels) are available at the workstation WS. Items IT produced are stored in a local inventory INV, each with their kanban K attached. When an item IT is withdrawn for consumption CONS, the kanban K is detached and returned RET to the workstation WS in order to authorize replenishment for the consumed item IT. The total number of kanban cards K is limited to balance inventory level with the production and consumption ratio of the items IT. This allows at the same time to reduce the WIP and to have some items ready for asynchronous consumption.

Traditionally, kanban synchronized production only relies on such visual signals as cards without the need for computer systems issuing and tracking production orders. However, this simple kanban implementation does not fit complex manufacturing cases with bill of materials often made by hundreds of different sub-assemblies and components. In such circumstances computer systems are helpful in order to manage the vast amount of different items and Stock-Keeping Units (SKUs) present in the shop floor. It is then possible to extend the "pull" signaling concept of the simple kanban rule by implementing a computer-managed "electronic kanban". Directly following the production requests, the electronically issued "kanban" signals authorize the material handling and the production activities at the workstations, taking the place of traditional production orders issued in advance by the computer system. When an "electronic kanban" signal is received to authorize a processing, the item to be processed is electronically signaled, without the need to have a distinct physical card for each of the hundreds of possible different items.

In these complex manufacturing cases, the use of radio frequency identification (RFID) to track materials in the shop floor wirelessly using radio waves can greatly speed up the material handling operations. Moreover, RFID tracking can play a major role in synchronizing JIT operations managed by electronic kanban.

Electronic kanban works like simple kanban, with the only difference that the signals issued are not targeted to pre-defined items but are "generic", i.e. the item to be produced or moved under authorization of the kanban signal can change accordingly to the production needs. The kanban visual signal is then just used to synchronize the JIT operations without explicitly telling what has to be consumed or produced: the computer system transforms such "generic kanban" into detailed requests for items to be moved and/or subassemblies to be produced.

The conventional solution adopted up to now is to carry out kanban logic by visual signals or kanban cards running independently, with the use of RFID technology limited only to tracking and tracing the resulting material flow.

FIG. 2 shows a process of production of items, using RFID identification, according to the prior art. Over a supply chain partner SCP1, raw material is supplied to a manufacturer process MP, where the raw materials are transformed into intermediate or finished products, before they are handed over to a downstream supply chain partner SCP2.

The manufacturer process MP contains several production stages PS, including a receiving terminal, depallet, storing, production, packaging storing, picking palletizing, and terminal. Each one of the production stages can include subproduction stages (not depicted). An RFID-reading unit RFR, located at a production stage PS is used to identify items to which an RFID tag is attached, providing real-time detailed information about where and when an RFID tag has been detected. Such information is used to identify parts, track lot history and build material genealogy reports, measure workstation performances and waste. Production activities are coordinated by predefined production rules run by the Manufacturing Execution System MES and triggered by the receipt of RFID events. The RFID technology extends the capabilities of a MES system but the flow of information that is managed only follows the material flow itself without actually steering the material handling process involved in the production activities.

SUMMARY OF THE INVENTION

It is accordingly an object of the invention to provide a method of controlling a production process which overcome the above-mentioned disadvantages of the prior art methods and devices of this general type, which increases the efficiency of a production process.

According to the invention, a flow of items is generated in a production system. Electronic devices that are attachable to the items are used for tracking the items. A first electronic device contains an identification RFID tag. The first electronic device is attached to a first item that is part of the flow of items. The identification of the first electronic device is read out of the first electronic device and forwarded to a computer system. The computer system steers the flow of items. Due to a reception of the identification by the computer system, a transport status for a second item that is also part of the flow of items is set. The transport status for the second item is a parameter that indicates authorization or prohibition to process the second item. The transport status for the second item is transmitted to a second electronic device that is attached to the second item. This is done by an authorizing signal that contains the transport status for the second item, whereas the authorizing signal is sent from the computer system to the second electronic device. In order to receive the authorizing signal, the second electronic device contains a signal receiver circuit.

According to a preferred embodiment, the first and the second electronic device are at least partially identical in architecture. For example, additionally to the identification of the first electronic device, the first electronic device contains a signal receiver circuit for receiving an authorizing signal from the computer system that includes a transport status for the first item. Analogously, additionally to the signal receiver circuit of the second electronic device, the second electronic device contains an identification for identifying the second device to the computer system. Preferably all electronic devices that are attachable to items in order to track the items are at least partially identical in architecture. This way, only one class or a limited number of classes of electronic devices are required in order to control the production process.

According to another preferred embodiment, the first electronic device and the second electronic device are completely identical, including identical identifications. This is particularly useful, if the kind of items the first and second electronic devices are attached to are the same. However, according to another preferred embodiment, the first and the second electronic device contain each a different individual identification. This example is useful to individually address items to which an electronic device is attached individually. These items can be of the same kind, or even different.

According to another preferred embodiment, the first electronic device and the second electronic device each contain a signal receiver circuit and an identification. Each signal receiver circuit is adapted to receive an authorizing signal that contains a transport status indicating authorization or prohibition to process the item the electronic device is attached to. In addition, the first electronic device and the second electronic device each contain an identification for being identified to the computer system.

According to another preferred embodiment due to a receiving of the authorizing signal, the second electronic device indicates the transport status for the second item with a visible signal. This way, personnel that is involved in the production process immediately sees if the second item allowed to be further processed or not. In case personnel erroneously processes the second item, although the transport status prohibits this, a mechanism that generates an acoustic warning signal or a visible warning signal can be implemented in the second electronic device.

According to another preferred embodiment, due to a receiving of the transport status for the second item by the second electronic device, the transport status indicating an authorization to be processed, the second item is processed automatically. For example, a transportation system carrying the second item can be advised to transport the second item to the next production stage.

According to another preferred embodiment the computer system contains a MES that has embedded in a MES layer a logic for steering the flow of items in the production system. The logic preferably includes a workflow management system and retrieves information from a data base or from an external system for coordinating the flow of items. The information can for example include material requirements and information of the routing between production stages for each item, e.g. in the form of rules.

According to another preferred embodiment the identification of the first electronic device is read out by a reading unit that is located at the first production stage due to a processing of the first item at a first production stage. In a forward direction of the flow of items the second electronic device to which the transport status is transmitted is located at a second production stage that is located before the first production stage. This embodiment is for example useful to reorder material for replacing the first item after being processed.

According to another preferred embodiment, the identification of the first electronic device is read out by a reading unit that is located at the first production stage due to a processing of the first item at a first production stage. In a forward direction of the flow of items, the second electronic device to which the transport status is transmitted, is located at a second production stage that is located after the first production stage. This embodiment is for example useful to reserve space in the second production stage where an arrival of material might be expected due to the processing of the first item.

According to another preferred embodiment, the second item is identical to the first item or a material contained in the second item (e.g. in case the item is a container or pallet that contains material relevant to the production process) is identical to a material contained in the first item.

According to another preferred embodiment, the second item is used for producing an item that is identical to the first item or that a material contained in the second item is used for producing a material that is identical to a material contained in the first item.

According to another preferred embodiment, the reading out of the identification of the first electronic device is performed due to a withdrawal of the first item from the production system.

According to another preferred embodiment, wireless communication between the electronic devices and the computer system are used. For example, the identification of the first electronic device (and preferably any identification of the other electronic devices) is stored in a radio frequency identification (RFID) transponder and read out wirelessly from the first electronic device. Preferably all identifications to be read out are read out by wireless communication from their electronic devices. Also the transport status of the second item is transmitted by wireless communication from the computer system to the second electronic device (and preferably the transport status of any other item that is part of the flow of items is transmitted by wireless communication to an electronic device attached to the item). In other words, one could therefore say that this preferred embodiment provides a wireless control of material handling in a just in time production process.

According to another preferred embodiment, just-in-time control of material handling is achieved by placing on each of the items to be handled an electronic device that combines an RFID tag with a signal receiver unit and a visual signaling unit (e.g. a high luminosity LED) that is able to produce the visual signal indicating authorization or prohibition of moving and/or processing the item to which the device is attached. For example by using a modified RFID radio protocol or a separate protocol for transmitting authorizing signals to the devices, it is possible to transmit to on of the devices a signal that denies or authorizes the movement of the item the device is attached to. Such an active device differs from an RFID tag used up to now in that it not only acts as a tag traced by an RFID reader, but in that it is also capable to react to specific radio commands (i.e. authorizing signals). Such commands are used to activate a visual signaling unit connected to the device itself. This visual signaling unit can for example display simple "STOP" or "GO" information by lighting the red or the green LEDs which can be used for authorizing the movement of the corresponding item to the next downstream production stage in accordance to the routing of the manufactured product. The same antenna of the RFID reader unit can be used to transmit the authorizing signal to a device, preferably under supervision of a software control system that manages the overall flow of operations. Preferably all items are constantly monitored by an RFID identification by the computer system, which typically includes an MES. The MES is preferably adapted to compute at any time exact material requirements for each stage of the production process thus sending authorizing signals indicating authorization for being moved just to the required items.

According to another preferred embodiment, relating to more complex production systems, the transport status of the second item is not only set due to the reception of the identification of the first device by the computer system, but due to a reception of the identifications of a plurality of RFID-tags formed by electronic devices, whereas each of the electronic devices is attached to an item within the production process. However, there will always be a last RFID (which in the logic of the claims is the RFID of the first device) that is read out to the computer system, and ultimately causes the setting of the status of the second device. Other features which are considered as characteristic for the invention are set forth in the appended claims.

Although the invention is illustrated and described herein as embodied in a method of controlling a production process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
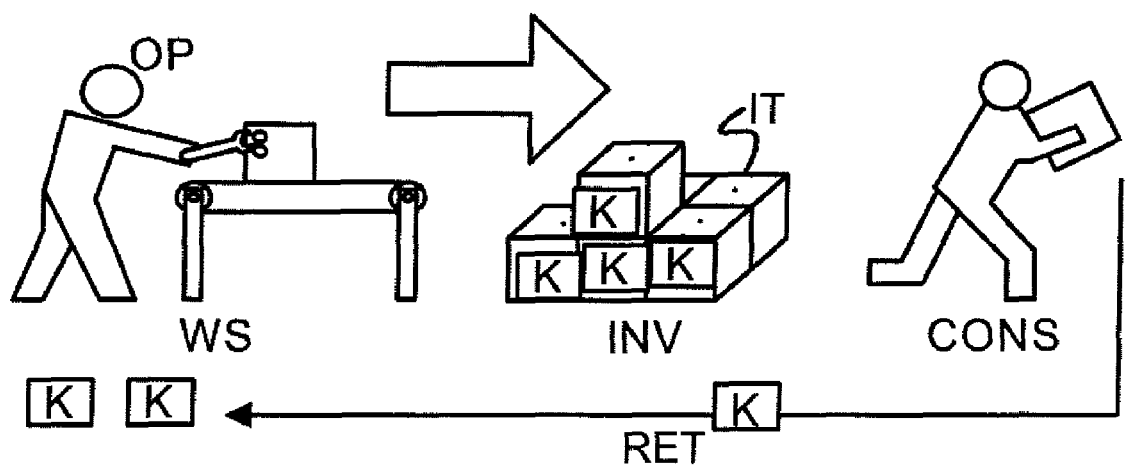
FIG. 1 is an illustration showing a processing of production of items, using kanban cards, according to the prior art.
Figure 2:
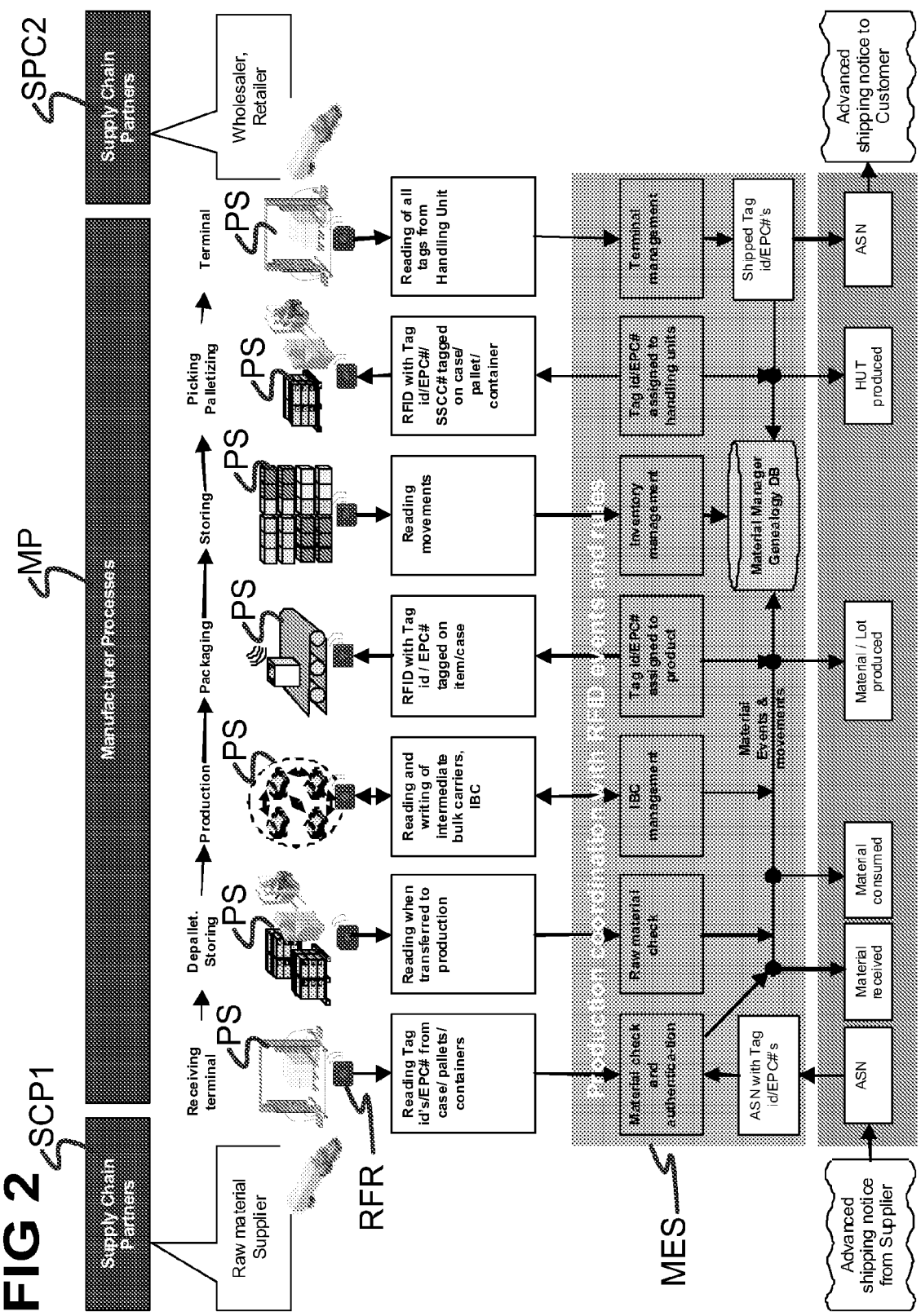
FIG. 2 is an illustration showing a processing of production of items, using electronic kanban, according to the prior art.
Figure 3:
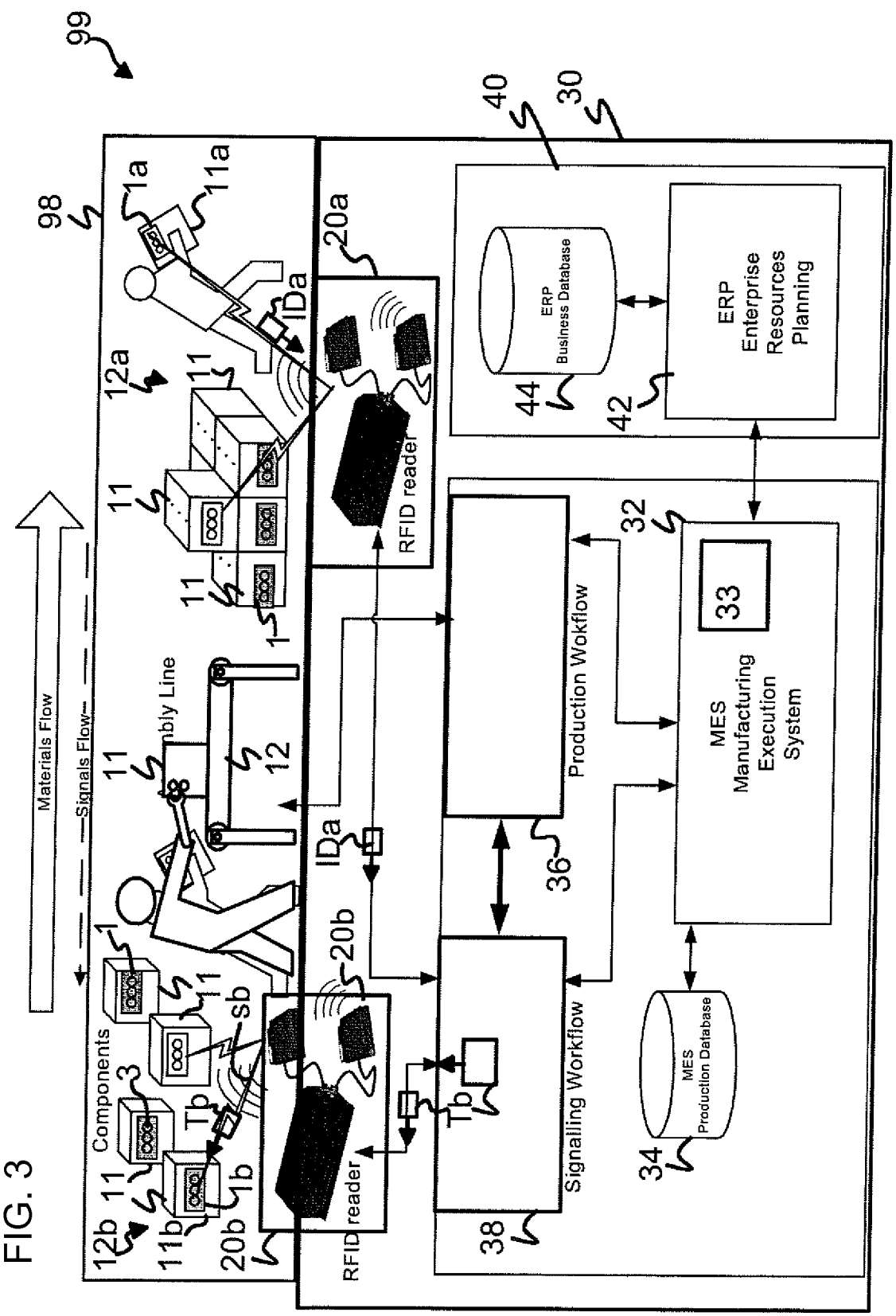
FIG. 3 is an illustration showing a system 99 according to a preferred embodiment with means for performing the inventive method according to a preferred embodiment.

Referring now to the figures of the drawing in detail and first, particularly, to FIG. 3 thereof, there is shown a system 99 illustrating preferred embodiments of the system and the process. The system 99 contains a production system 98 and a computer system 30.

The production system 98 contains production stages 12, for example workstations and apparatuses for processing items 11 that are part of a flow of items 11. For clarity reasons, a first one of the production stages is labelled 12a and a second production stage is labelled 12b. In this embodiment, in a forward direction of the flow of items the second production stage 12b is located before the first production stage 12a. Active electronic devices 1 are attachable to the items 11. For reasons of clarity, two of the items 11 are specifically addressed as the first item 11a (located at production stage 12a) and the second item 11b (located at production stage 12b) and two of the electronic devices are addressed as the first device 1a and the second device 1b. The first device 1a is attached to the first item 11a and the second device 1b is attached to the second item 11b.

Each electronic device 1, 1a, 1b is equipped with an RFID transponder (also called RFID tag), a signal receiver circuit 2 (see FIG. 4) for receiving an authorization status, and a visual signaling unit 3 (due to a lack of space in the figure, not all items, electronic devices and signaling units are labelled with reference signs). Each RFID transponder contains an identification in order to identify the electronic device and with it the item the electronic device is attached to. The electronic devices 1, 1a, 1b are used to track the presence and to authorize the handling of each item 11 with a visual "STOP/GO" signal that is displayed on the visual signaling unit 3.

The computer system 30 contains an MES 32, an MES production database 34, a business-level information system 40 including a system for enterprise resources planning 42 and an enterprise resources planning database 44. According to a preferred embodiment the MES 32 is responsible for the overall production control and the data collection tasks related to all activities involved in the manufacturing process. It is also responsible for the connection with the business-level information system 40. The MES 32 contains a production workflow 36 and a signaling workflow 38. The signaling workflow 36 controls the flow of information and the production workflow 38 controls the material processing and the flow of materials.

A workflow management system 33 embedded in the MES layer provides the execution logic for the workflows for production and for signaling. The workflow management system 33 is used for coordinating and synchronizing both, the material flow and the signal flows.

Wireless communication units 20a, 20b (e.g. RFID reading units, placed in proximity of key areas and workstations) are adapted to establish a bi-directional connection with an electronic device 1, 1a, 1b, in order to read out the identifications from the devices 1, 1a, 1b and in order to transmit authorizing signals to the devices 1, 1a, 1b. A software module of the MES 32 is dedicated to manage, under control of the appropriate workflow, the data I/O from/to the RFID reader units 20.

According to a preferred embodiment the identification IDa of the first electronic device 1a is read out, by the wireless communication unit 20a. The identification IDa is forwarded to the computer system 30. Due to a reception of the identification IDa by the computer system 30, a transport status Tb for a second item 11b is set. The transport status Tb indicates authorization to process the second item 11b. The transport status Tb is transmitted to the second electronic device 1b with an authorizing signal sb that is sent from the computer system 30 to the second electronic device 1b. The second device 1b then indicates the transport status by a visual signal, for example a green light, indicating authorization for personnel to process the second item 11b. Alternatively, or in addition to the visual signal, due to the receiving of the transport status Tb the second item 11b is processed automatically, e.g. by a transportation system (see FIG. 4).

Further preferred embodiments provide solutions suitable for complex manufacturing cases where the flow of items 1 and signals are managed by a workflow-capable MES 32. Visual signals authorizing or prohibiting item movements and/or processing are directly displayed on a visual signaling unit 3 of the device 1, 1a, 1b that is attached to an item 11, 11a, 1b, under MES supervision via RFID identification.

According to a preferred embodiment, inside the computer system 30 at least two workflows are depicted: a conventional workflow that controls (by use of product production rules) the forward-directed flow of items 11, 11a, 11b (moved between the production stages 12, 12a, 12b and transformed from raw materials to intermediate or finished products) and the flow of information for the JIT "pull" signals, which is often referred to as "backward flow of information", although it can also include forward directed information. Movement of items 11, 11a, 11b is authorized by visual signals generated by the devices 1, 1a, 1b that are attached to the items 11, 11a, 11b in order to handle the production process. These devices 11, 11a, 11b permit to track material movements and at the same time to effectively implement "electronic kanban" signals used to synchronize both, production and item handling.

According to a preferred embodiment each production stage 12, 12a, 12b in a shop floor is capable to produce a great number of different items 11, 11a, 11b (finished products or sub-assemblies). Each of the items 11, 11a, 11b is equipped with an electronic device 1, 1a, 1b that is capable to receive an authorizing signal that contains a transport status indicating authorization or prohibition of a movement of the item 11, 11a, 11b, and an RFID-tag for identifying the device via an RFID reading unit 20a, 20b to a computer system 30. In order to limit the level of WIP in the plant, only a small number (one or more) of items 11, 11a, 11b are allowed to be present at each production stage 12, 12a, 12b. Workstations stay idle until an authorizing signal authorizes the production of the next item.

When some specific item 11a is requested for processing (e.g. an assembly operation) by a downstream production stage 12b, the system 99 identifies at an upstream production stage 12a the just requested item 11a due to an RFID tag of an electronic device 1a that is attached to the item 11a and sends to the device 1a an authorizing signal indicating authorization for further processing the item. If more than one kind of different items 11, 11a are present at the upstream production stage 12a, the correct item 11a can then be easily and quickly identified by personnel involved in the production process due to a visual signal that is displayed on the device 1a, and thus be moved to the downstream production stage 12b. Intermediate production stages 12 can be located between the upstream production stage 12a and the downstream production stage, where the item 11a is further processed while being moved to the downstream production stage 12b. In addition, the intermediate production stages 12 and the downstream production stage 12b are authorized to start working, e.g. in order to refill space left by another item 11b that was previously just withdrawn from the downstream production stage 12b.

An item that is to be produced can be of the same kind of a just withdrawn one, or even of a different kind. The MES is capable to discover this (e.g. on the basis of the final assembly sequence for the finished products) and, on the basis of a bill of material for what has to be produced, to identify via RFID required upstream items 11a. Then the MES sends to such items 11a authorizing signals indicating authorization for being moved. Following the same principle, signals are backward propagated by the MES to all the upstream production stages 12, 12a of the supply chain, on the basis of the JIT "pull" requests coming from the downstream production stages.

The workflow management system 33 is used to synchronize these JIT operations. Two main workflows are depicted in the computer system 30: the production workflow 36 for tracking the material flow and the signaling workflow 38 for steering the material flow by electronic authorizing signals triggered by "pull" actions from a production stage. The signaling workflow 38 thereby steers the items 11, 11a, 11b and enables quick and easy visual identification at the location of the required items, thus simplifying and speeding up overall material handling procedures.

The handling of items 11, 11a, 11b can then be automated and/or be performed manually. When handled manually, items 11, 11a, 11b to be moved can be immediately spotted by the shop floor personnel looking at the visual signals that authorize the movements.

The following table shows an example of a material oriented workflow and a signal oriented workflow. In this example items are containers that hold materials.

| Step | Material oriented | Signal oriented |
| --- | --- | --- |
| 1 | | Wait for a request for an material from a workstation |
| 2 | | <<A request for a material arrives>> |
| 3 | | Identify at an upstream workstation via RFID the container carrying the requested material |
| 4 | | Send an authorizing signal to the electronic device attached to the container in order to authorize movement for withdrawal |
| 5 | Move container to the requesting workstation, withdraw the material, leave the container empty | Identify via RFID the empty container and send an authorizing signal to the electronic device attached to the empty container in order to authorize return to the upstream workstation |
| 6 | Move back the empty container and wait for production authorization | |
| 7 | | Identify next material to be produced to replace the withdrawn one |
| 8 | | Send a kanban signal to authorize production of the new material |
| 9 | <<The electronic kanban signal received authorizes production of a new material>> | |
| 10 | Check bill of material for the new material and ask for the required components | Identify via RFID all the containers carrying the required components |
| 11 | | Send authorizing signals to the containers carrying the components to authorize the movement for withdrawal |
| 12 | Move the containers carrying the required components next to the assembly workstation | |
| 13 | Withdraw requested components, leave the containers empty | Identify via RFID the empty container and send an authorizing signal to the container in order to authorize their return to the upstream stage |
| 14 | Move back the empty containers | Send kanban signals to the upstream stage to authorize replacement of the withdrawn components |
| 15 | Start producing the new material by assembling the components | |
| 16 | Store the material produced in a container next to the workstation | Identify via RFID the container with the new material and wait for new requests |

The underlying MES infrastructure hosts both the control workflows and the basic services for the interconnection and communication with the RFID layer and the shop floor automation. The combination of RFID tracking with direct visual signaling permits to steer the material handling in a Just in Time way. False movements, job queuing and excess of WIP are then avoided in advance.

Figure 4:
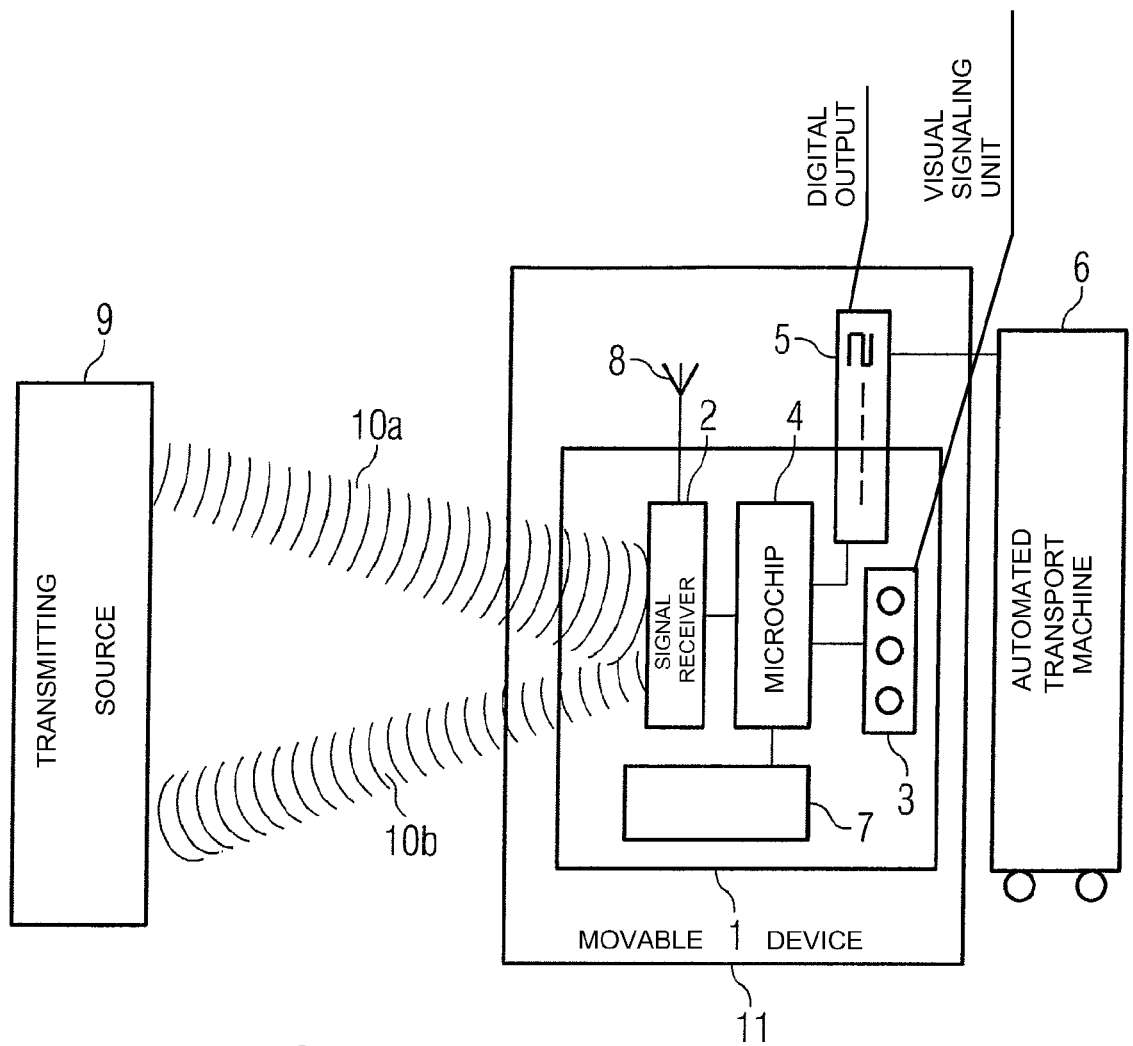
FIG. 4 is a block diagram of an electronic device which can be used in order to implement preferred embodiments of the invention.

Further preferred and with regard to FIG. 3 more detailed embodiments are in the following discussed, based on FIG. 4, describing the devices 1, 1a, 1b, the RFID reading units 20a, 20b and a transport system 6 in more detail.

An optionally automated transport machine 6 is attached to a movable item 11, like for example a box or any other merchandise that follows logistical transport requirements in a production line or in a storage area for products. In order to permit an identification of one of such movable items 11, a device 1 like an electronic ID-tag is attached to the item (and hence displaced with the item), whereby the device 1 provides a communication path with an external ID-tag-reader, such as e.g. the RFID reading unit 20a, 20b described in FIG. 3, containing a transmitting source 9 and a receiving element for getting identification data of the movable item 11.

The transmitting source 9 transmits a wave 10a to the device 1 for electronic identification of the movable item 11. The signal receiver circuit 2 receives the wave via an antenna 8, demodulates it and passes the resulting signal to a microchip 4. The microchip 4 is connected to a visual signaling unit 3 and with signaling digital output 5. By the signaling digital output, the microchip transmits data to a transportation system 6 if an automated logistical unit performs the transport otherwise data are transmitted optically/visually to an operator that can manually act on the logistic. The microchip stores the needed data in a non-volatile memory 7. The non-volatile memory can also contain identification data or serial numbers of movable item 11. This data can be modulated into a reflected wave the signal receiver circuit 2 reflects to the transmitting source 9.

The device 1 can be used for electronic identification of items and contains a signal receiver circuit 2 and a signaling unit (preferably visual) that, based on a received signal at the signal receiver circuit 2, indicates a transport status of an item to which the device 1 for electronic identification of items is attachable. The proposed solution advantageously enables the implementation of Just-In-Time handling of items making it possible not only to track movements of the item but also to steer them, thus avoiding potential queues and production bottlenecks. Over the signaling device containing a visual signaling unit 3 it is possible to provide a (optical) digital output of logistical information data that are interpretable by a human operator or any other else "viewing" machine interface. It is also possible to realize the signaling device with some digital signaling output transmission device that enable a communication between the item and an automated machine.

In a preferred embodiment, a microchip 4 is connected to the signal receiver circuit 2 and contains means for adapting a received signal in order to provide information readable by one or more further connected devices. This advantageously allows the adaptation of the device to numerous customisable applications and makes it possible to connect the device to numerous devices used in an automation process.

In a preferred embodiment, the microchip 4 is connected to the visual signaling unit 3 and has means for transmitting transport status indication commands to the visual signaling unit 3. The advantage is that the microchip 4 can be programmed to suit any requirements in order to control different types of visual signaling units.

In a preferred embodiment, the microchip 4 is connected to and has means for transmitting transportation commands via a signaling digital output 5 to a transportation system 6. This advantageously makes the device more flexible to requirements of system automation and expands the possibilities of use of the device.

In a preferred embodiment, the signal receiver circuit 2 contains a non-volatile memory unit 7 used to store the product identification data and the transportation and transport status indication commands. The advantage is that all data needed by the microchip 4 as well as information about the item the device is attached on is stored in a way that the data and information is available at all times and does not need to be reloaded every time the device is used.

In a preferred embodiment, the visual signaling unit 3 contains color-coded means or other variable visual patterns indicating whether the transport of the product is to be stopped or continued. This advantageously makes it easier for logistics personnel to determine the status of an item to be transported.

In a preferred embodiment, the visual signaling unit 3 additionally contains color-coded means or other variable visual patterns indicating whether the product is to be placed in a production holding pattern. The advantage is that logistics personnel or a machine easily determines if an item is ready to be processed by further means.

In a preferred embodiment, the visual signaling unit 3 contains optical emitting means, ideally control lamps or/and optoelectronic devices, each separately emitting light of a different color. The advantage is that numerous different states of an item in terms of transportation, sorting or further processing can be signalized.

In another preferred embodiment, the visual signaling unit 3 contains an electronic paper (e-paper) device. One important advantage of the electronic paper device is that the image can be maintained without a constant supply of power. The electronic paper device can provide and display logistic information related to transport status of the movable item 11 both in a human-readable and in a machine readable format (barcode or other), thus enabling the usage of existing bar-code readers widely employed for logistic purposes.

In a preferred embodiment, the visual signaling unit 3 provides the variable visual pattern in the form of a barcode or a 2D image code that can be read by standard optical scanners. This advantageously increases the efficiency of the item handling insofar that widely spread standard machines can be used to interpret the barcode or 2D image code in order to automate the process of item displacement, sorting or storage.

In a preferred embodiment, the signal receiver circuit 2 contains at least one antenna 8. Furthermore the signal receiver circuit 2 can be adapted to receiving radio frequency signals. This advantageously enables the device to receive signals and commands from a remote device wirelessly.

In a preferred embodiment, the signal receiver circuit 2 is powered by a battery. This advantageously makes the device independent of outer power sources.

In a preferred embodiment, the signal receiver circuit 2 is powered by a current induced by an electromagnetic wave 10*a* provided by a transmitting source 9 which is located in reception range of the signal receiver circuit 2. Another way the power delivering for the device can be achieved is advantageously by rendering the device passive in a way that the power is provided externally and wirelessly.

In a preferred embodiment, the visual signaling unit 3 is powered by the current induced by the electromagnetic wave 10*a* provided by the transmitting source 9 which is located in reception range of the signal receiver circuit 2. This advantageously renders the signaling unit independent of local power furnishing, for example by getting the power from the signal receiver circuit 2.

In a preferred embodiment, the signal receiver circuit 2 has means to demodulate a modulated signal contained in the electromagnetic wave 10*a* provided by the transmitting source 9 and interpret a thereby demodulated signal. The advantage is that any commands or information can be wirelessly sent to the device, the latter having the capability to interpret the commands or information.

In a preferred embodiment, the signal receiver circuit 2 has means to reflect to the transmitting source 9 an electromagnetic wave 10*b*. The advantage is that the device does not need an explicit sender unit, thereby simplifying the circuits of the device.

In a preferred embodiment, the signal receiver circuit 2 has means to modulate stored information into the reflected electromagnetic wave 10*b*. The advantage is that the device is able to add information which it stores to the electromagnetic wave 10*b*, thereby enabling a remote system to read the information, for example identification or serial numbers, transport destination data, information on the product (inflammable, fragile, etc.), etc.

In a preferred embodiment, the transmitting source 9 and the signal receiver circuit 2 use a proprietary protocol for the exchange of data. This advantageously enables the device to be used by different wireless communication systems. A further advantage is that for example security sensitive data can be wirelessly transmitted using a transmission protocol only known to the authorized system for i.e. logistics.

In another preferred environment the transmitting source 9 and the signal receiver circuit 2 use a standard RFID protocol for the exchange of data. This advantageously allows the use of existing devices 1 for electronic identification of items which support uniquely the standard RFID protocol, thus rendering the present invention compatible to state of the art solutions.

In a further preferred embodiment of the invention, a system for tracking and transportation of an item is proposed, containing the device 1 for electronic identification of items and an electronic product tracker, wherein the electronic product tracker contains means for receiving and interpreting commands from the product identification device 1 via a signaling output in order to locate the position of the device. This advantageously provides a higher range of flexibility in handling the device by enabling the system to automatically read out needed information from the device, for example destination of storage of product handling information.

The system can contain an electronically controlled product transporter, wherein the electronically controlled product transporter contains means for receiving and interpreting commands from the product identification device 1 via the signaling output in order to move and sort products and materials. This advantageously automates a logistic path for an item to be transported and avoids time wasting as well as the intervention of personnel.

The signaling output mentioned above can be a signaling digital output 5 or/and a visual signaling unit 3. This makes the system easily and flexibly adaptable to interfaces and signal input devices connected to further machines involved in the transportation or tracking of items.

The invention presents advantageously a possible use of the device for controlling a location based logistic of movable items in an area, providing an improvement of the all in all efficiency of the logistics system by for example making it easy to analyze bottlenecks or dealing with high load times. Furthermore it is possible to centralize all information from numerous items in order to have an improved overview about all involved logistical processes.

Another advantage is the use of the device for triggering at least one displacement machine, for example if the item and its device are entering an action area of the said machine. Instead of triggering a machine, the device can also be used for indicating (over the visual signaling unit 3) to human operators if or/and which one of a plurality of items has to be carried from a place to another place. For example, if the visual signaling unit 3 switches a green light, the item can be moved from its present place to another one. If the visual signaling unit 3 switches a red light, the item has to stay at its present place. If the visual signaling unit 3 switches a yellow light, the item is at wrong place and the location of item has to be manually controlled. The visual signaling unit 3 can also contain more visual signaling codes that deliver finer information on the way of achieving a logistical process.

The invention claimed is:

1. A method for controlling a production process, which comprises the steps of:
    generating a flow of items in a production system, the items having electronic devices attached for tracking the items;
    reading out an identification of a first electronic device of the electronic devices, the first electronic device being attached to a first item of the items;
    forwarding the identification to a computer system that steers the flow of items;
    setting a transport status for a second item of the items due to a reception of the identification by the computer system, the transport status indicating authorization or prohibition to process the second item; and
    transmitting the transport status to a second electronic device of the electronic devices with an authorizing signal sent from the computer system to the second electronic device, the second electronic device containing a signal receiver circuit for receiving the authorizing signal and the second electronic device being attached to the second item.

2. The method according to claim 1, which further comprises forming the first electronic device and the second electronic device to be at least partially identical in architecture.

3. The method according to claim 1, wherein each of the first electronic device and the second electronic device have:
    the signal receiver circuit for receiving authorizing signals, whereas each received authorizing signal contains the transport status indicating authorization or prohibition to process the item having the attached electronic device; and
    the identification for identifying the electronic device that contains the identification via a wireless communication unit to the computer system.

4. The method according to claim 1, which further comprises upon receiving the authorizing signal, indicating, via the second electronic device, the transport status for the second item with a visible signal.

5. The method according to claim 1, which further comprises upon receiving the transport status for the second item by the second electronic device, the transport status indicating an authorization to be processed, the second item is processed automatically.

6. The method according to claim 1, wherein the computer system contains a manufacturing execution system having a MES layer with execution logic for steering the flow of items in the production system.

7. The method according to claim 6, wherein the execution logic contains a workflow management system.

8. The method according to claim 6, which further comprises retrieving, via the execution logic, information from a data base or from an external system for coordinating the flow of items.

9. The method according to claim 1, wherein due to a processing of the first item at a first production stage, the identification of the first electronic device is read out by a reading unit that is located at the first production stage, whereas in a forward direction of the flow of items the second electronic device to which the transport status is transmitted is located at a second production stage that is located before the first production stage.

10. The method according to claim 1, wherein due to a processing of the first item at a first production stage, the identification of the first electronic device is read out by a reading unit that is located at the first production stage, whereas in a forward direction of the flow of items, the second electronic device to which the transport status is transmitted is located at a second production stage that is located after the first production stage.

11. The method according to claim 1, which further comprises performing one of the steps of:
    forming the second item to be identical to the first item; and
    forming a material contained in the second item to be identical to a material contained in the first item.

12. The method according to claim 1, which further comprises performing one of the following steps:
    using the second item for producing an item that is identical to the first item; and
    using a material contained in the second item for producing a material that is identical to the material contained in the first item.

13. The method according to claim 1, which further comprises performing the reading out of the identification of the first electronic device due to a withdrawal of the first item from the production system.

14. The method according to claim 1, wherein the first electronic device and the second electronic device communicate by a wireless technology with the computer system.

15. A system, comprising:
    means programmed to:
        generate a flow of items in a production system, the items having electronic devices attached for tracking the items;

read out an identification of a first electronic device of the electronic devices, the first electronic device being attached to a first item of the items;

forward the identification to a computer system that steers the flow of items;

set a transport status for a second item of the items due to a reception of the identification by the computer system, the transport status indicating authorization or prohibition to process the second item; and transmit a transport status to a second electronic device of the electronic devices with an authorizing signal sent from the computer system to the second electronic device, the second electronic device containing a signal receiver circuit for receiving the authorizing signal and the second electronic device being attached to the second item.

* * * * *